United States Patent
Trogstam et al.

(12)

(10) Patent No.: US 6,394,033 B1
(45) Date of Patent: May 28, 2002

(54) BEDDING REMOVAL AND REFILLING SYSTEM FOR ANIMAL CAGES

(75) Inventors: H. Mikael Trogstam; K. Magnus Nilsson, both of Strangnas (SE)

(73) Assignee: Steris Inc., Temecula, CA (US)

( * ) Notice: Subject to any disclaimer, the term of this patent is extended or adjusted under 35 U.S.C. 154(b) by 0 days.

(21) Appl. No.: 09/500,761

(22) Filed: Feb. 8, 2000

Related U.S. Application Data

(60) Provisional application No. 60/119,116, filed on Feb. 8, 1999.

(51) Int. Cl.[7] .................................................. A01K 1/01
(52) U.S. Cl. ........................ 119/458; 119/419; 119/161
(58) Field of Search .................. 119/161, 164, 119/165, 419, 452, 458, 493, 843

(56) References Cited

U.S. PATENT DOCUMENTS

| | | | | |
|---|---|---|---|---|
| 4,009,685 A | * | 3/1977 | Sojka ............................ | 119/22 |
| 4,095,559 A | * | 6/1978 | Griffith ......................... | 119/1 |
| 5,003,920 A | * | 4/1991 | Miksitz ........................ | 119/163 |
| 5,032,254 A | * | 7/1991 | Deboer et al. ................. | 209/10 |
| 5,439,015 A | * | 8/1995 | Shibano ........................ | 134/66 |
| 5,655,478 A | * | 8/1997 | Kiera ........................... | 119/165 |
| 5,771,840 A | | 6/1998 | Pelletier ....................... | 119/452 |
| 5,803,016 A | * | 9/1998 | Poulson ........................ | 119/161 |
| 6,027,608 A | * | 2/2000 | Gassner ........................ | 162/2 |

FOREIGN PATENT DOCUMENTS

| | | | |
|---|---|---|---|
| DE | 4138939 A1 | | 6/1993 |
| GB | 2 275 698 A | * | 9/1994 |
| GB | 2304351 A | | 3/1997 |
| JP | 09-107836 | * | 4/1997 |

* cited by examiner

*Primary Examiner*—Charles T. Jordan
*Assistant Examiner*—Kimberly S. Smith
(74) *Attorney, Agent, or Firm*—Fay, Sharpe, Fagan, Minnich & McKee, LLP

(57) ABSTRACT

A system (18) for handling animal cages (10) includes a low noise tipping funnel (16) into which waste bedding from the cage is emptied for transporting to a dumpster (20). The tipping funnel includes a receiving funnel (110) which receives the waste bedding. An air duct is positioned adjacent three sides of an upper opening (114) to the receiving funnel. A suction fan (76) draws airborne particles of the waste bedding into the air duct through a housing (134) over the top of the air duct. The housing creates an air path which minimizes transfer of noise generated in the suction process. The waste bedding is transferred from the receiving funnel into a vacuum line by a rotating valve (202) having a plurality of vanes (211). As the valve rotates, two or more of the vanes separate the receiving funnel from the vacuum line, minimizing transfer of noise from the vacuum line out through the upper opening of the receiving funnel.

19 Claims, 10 Drawing Sheets

BEDDING REMOVAL AND REFILLING SYSTEM FOR ANIMAL CAGES

This application claims the priority of U.S. Provisional Application Serial No. 60/119,116, filed Feb. 8, 1999.

BACKGROUND OF THE INVENTION

The present invention relates to the cage cleaning arts. It finds particular application in connection with the removal of dirty bedding from animal cages prior to cleaning and the subsequent refilling of the cages with clean bedding, and will be described with particular reference thereto. It should be appreciated, however, that the invention is also applicable to removal and replacement of hazardous particulate materials.

Animal testing laboratories and similar facilities typically have large numbers of animal cages to be emptied of dirty bedding, cleaned, and refilled with fresh bedding on a regular basis. The cleaning process poses hazards to workers. The cages are generally contaminated with dirt and feces, which may be particularly hazardous as a result of diseases and medications associated with the caged animals. Additionally, allergens are frequently associated with the bedding, even when the bedding is fresh, which are released into the air on airborne particles of the bedding.

To minimize exposure to these hazards during the cleaning process, it is desirable to provide an automated cage handling system which reduces operator handling of the cages. Operators are particularly susceptible to the hazards at two stages in the cleaning process, namely during emptying the cages into a disposal system, and during refilling of the cages with fresh bedding. Cage emptying stations which use a vacuum to draw the dirty bedding into a disposal system frequently generate unacceptable levels of noise and do not successfully remove contaminated airborne particles into the disposal system from the surrounding air.

At the clean side of the system, fresh bedding stored in a supply chamber is transported to a dispensing station. This process often results in the release of airborne particles of bedding, and potential allergens into the atmosphere.

The present invention provides a new and improved bedding removal and refilling system for animal cages which overcomes the above-referenced problems and others.

SUMMARY OF THE INVENTION

In accordance with one aspect of the present invention, a system for disposal of waste materials from animal cages is provided. The system includes a tipping funnel which receives the waste materials, which tend to release airborne particles. The tipping funnel includes a receiving funnel with an upper opening and a lower outlet, an air duct with an opening adjacent the upper opening of the receiving funnel, and a source of suction connected with the air duct. Air and the airborne particles are drawn into the air duct opening by the source of suction as the waste materials are tipped into the upper opening of the receiving funnel.

In accordance with another aspect of the invention, a method of handing waste materials which tend to become airborne is provided. The method includes tipping the waste materials into a receiving funnel through an opening in the receiving funnel, and drawing air into an air duct having an opening adjacent the receiving funnel opening to entrain particles of the waste materials which are airborne and carry the airborne particles into the air duct.

In accordance with another aspect of the present invention, a system for handling animal cages is provided. The system includes a tipping funnel which receives waste bedding from the cages for disposal. The tipping funnel includes a receiving funnel with an upper opening and a lower outlet, an air duct with an opening adjacent the upper opening of the receiving funnel, and a source of suction connected with the air duct. The system also includes a washer which cleans the cages emptied of waste bedding and a dispenser for dispensing fresh bedding into the cleaned cages.

One advantage of the present invention is that it provides an automated system for emptying and refilling animal cages with fresh bedding.

Another advantage of the present invention is that it reduces noise around a tipping funnel to well below acceptable industry standards.

Yet another advantage of the present invention is that it provides a tipping funnel which is readily disassembled for cleaning.

A further advantage of the present invention is that it permits cleaning of the tipping funnel without damaging a vacuum source for the funnel.

Still further advantages of the present invention will become apparent to those of ordinary skill in the art upon reading and understanding the following detailed description of the preferred embodiment.

BRIEF DESCRIPTION OF THE DRAWINGS

The invention may take form in various components and arrangement of components and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
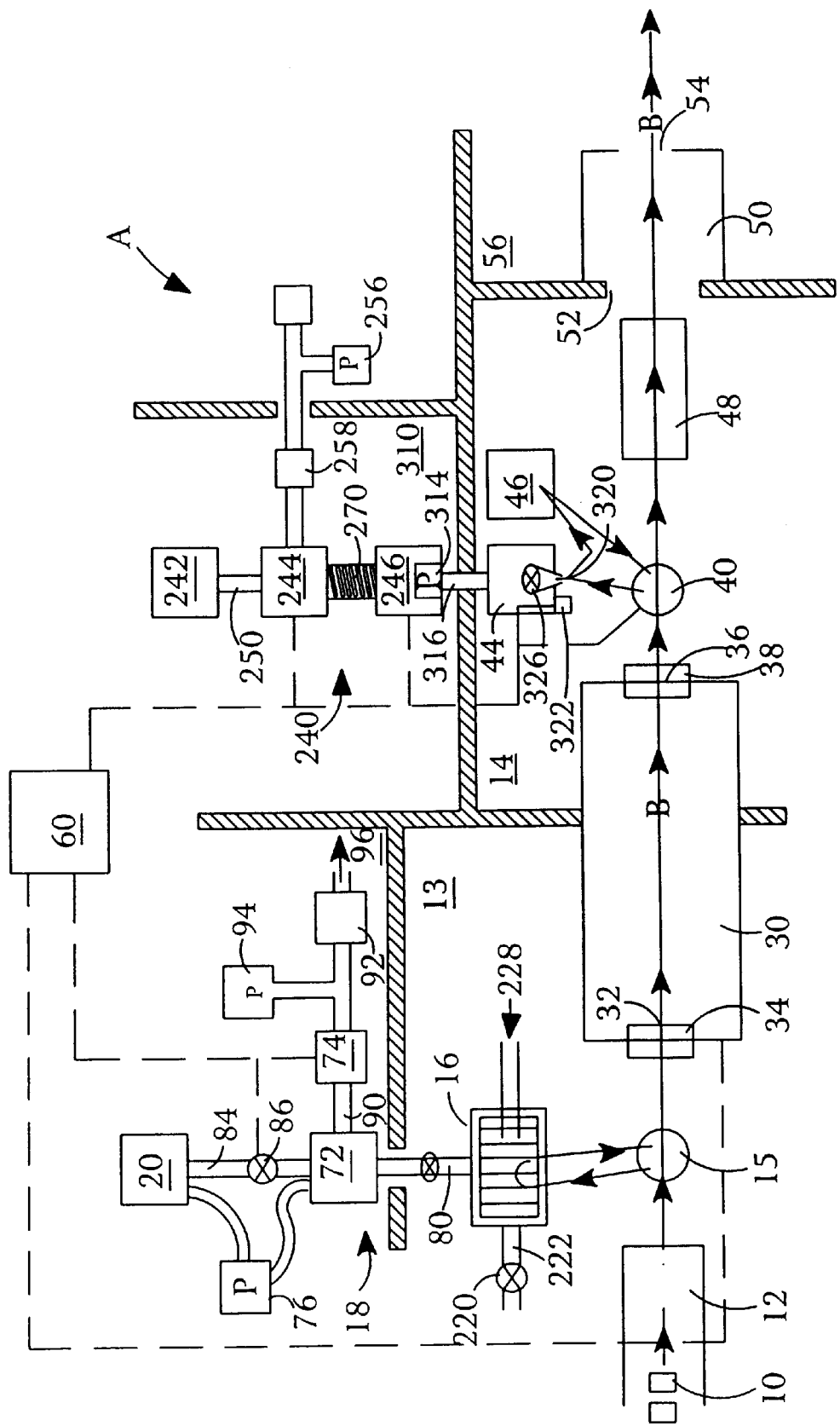
FIG. 1 is a schematic diagram of a system for removal of bedding, cleaning, and refilling for animal cages according to the present invention.

With reference to FIG. 1, a cage and bedding handling system A for cleaning and replenishing animal cages is shown. Animal cages 10 follow the path of arrows B through the system A as they are first emptied of dirty bedding, then cleaned, and refilled with clean bedding prior to sterilization of the refilled cage. The term "cage" is used to encompass a variety of receptacles in which animals are housed, including, but not limited to wire cages and transparent plastic boxes.

A first conveyor system 12 brings the dirty cages 10 into a "contaminated" room 13 which is kept separate from a "clean" room 14. A first industrial robot 15, takes each cage 10 to a tipping funnel 16 and inverts the cage to tip dirty bedding and animal waste from the cage into the tipping funnel. The tipping funnel 16 forms part of a bedding disposal system 18, which transports the dirty bedding to a dumpster 20 for disposal.

The first industrial robot 15 takes the emptied cages 10 and loads them into an automated washing system 30, such as a tunnel washer. Alternatively, the cages are manually emptied over the tipping funnel 16 by an operator and carried by hand to the washing system 30.

The tunnel washer 30 has a first opening 32, for receiving dirty cages in the contaminated room 13. The first opening is selectively closed by an inlet closure or door 34. A second opening 36 to the tunnel washer, through which washed cages are removed, is located in the clean room 14. The second opening is selectively closed by an outlet closure or door 38. The washer may be of a continuous type or manually loaded and unloaded after each cycle.

Once washed, the cleaned cages 10 are individually transported from the second opening 36 by a second industrial robot or operator 40 to a bedding dispensing station 44, where each cage is refilled with fresh bedding. Optionally, the cage is also transported to a water bottle refilling station 46, where fresh water is inserted in a clean water bottle. The second industrial robot 40 places the refilled cages on a second conveyor system 48, which transports the refilled cages to a sterilizer 50. In the sterilizer, both the cage and the bedding are sterilized or otherwise microbially decontaminated, and optionally also the water bottle. The sterilizer has a first opening 52 in the clean room 14, for receiving the bedding-filled cages, and a second opening 54 in a sterile room 56 for unloading the sterilized cages. Once the cages have been sterilized they are ready to be returned to a laboratory or other facility where animals are returned to the cages.

As described above, the system is automated, minimizing contact of operators with the dirty cages and with the bedding, which may be contaminated with feces, diseases, and allergens. Clean bedding, prior to sterilization, may also contain allergens which are released into the air with dust from the bedding.

A computer control system 60 preferably controls the operation of the robots and many other functions of the system, which will be discussed in detail below. However, it should be appreciated that some or all of the steps could be carried out manually.

Figure 2:
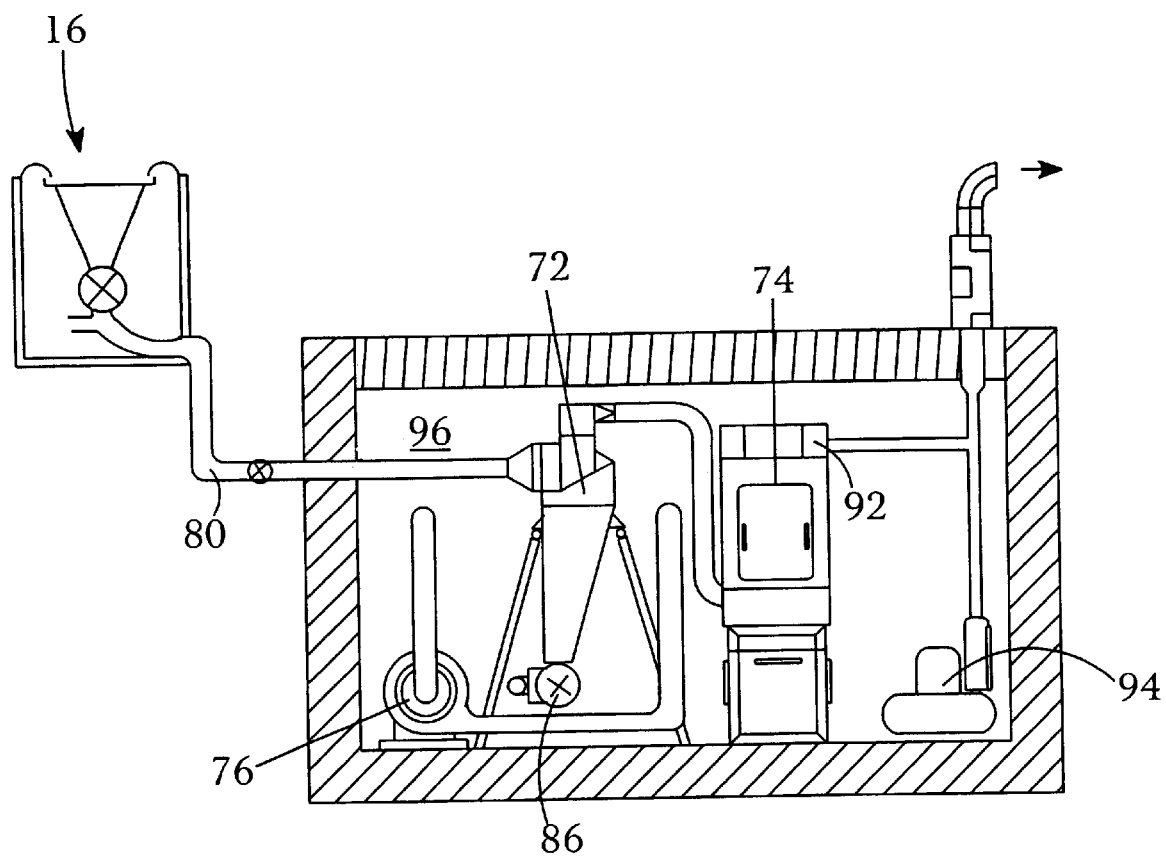
FIG. 2 is a side elevational view of the bedding disposal system of FIG. 1.

With reference also to FIG. 2, the bedding disposal system 18 includes, in addition to the tipping funnel 16, a preseparator 72, a cyclone separator 74, and a vacuum source, such as a transportation fan 76. The transportation fan 76 draws the dirty bedding via a vacuum line 80, such as a stainless steel pipe, from the tipping funnel 16 into the preseparator 72. The preseparator 72 discharges the dirty bedding into the dumpster 20 via a chute 84. The computer control system 60 detects the presence of a dumpster and opens a rotary valve 86 in the chute 84 to release the dirty bedding. Preferably, the system includes two or more preseparators 72 for filling separate dumpsters or for temporarily storing the dirty bedding while a dumpster is being replaced.

Transportation air used to draw the bedding into the preseparator 72 is removed to the cyclone separator 74 via a conduit 90. The cyclone separator uses a vortex of air to separate particulates, such as bedding particles, from the air. The bedding particles are collected at the base of the cyclone separator and transported to the dumpster. The separated air is passed through a filter 92 and exhausted to the atmosphere by a vacuum unit 94. The preseparator 72, cyclone separator 74, and transportation fan 76 are preferably housed in a "disposal" room 96, separate from the clean and dirty rooms 13 and 14.

With reference now to FIGS. 3–10, the tipping funnel 16 safely removes dirty bedding from the contaminated room 12 and also extracts a portion of the surrounding air, which is likely to contain particles of bedding, contaminated with feces, allergens, and the like. The tipping funnel includes an outer cabinet 100 with four rectangular sides 102 and a base 104. The cabinet holds a receiving funnel 110 with a side wall 112 and a rectangular upper opening 114 at an upper end 116 of the funnel 110. The upper opening is covered by a grille 118, best shown in FIG. 7. Adjacent three sides 120, 122, and 124 of the funnel opening, an air duct 128 with an upper opening 129 is formed between the funnel side wall 112 and the cabinet side 102. The air duct is covered at its upper end by an air inlet manifold 130. Air and airborne particles from around the upper opening 114 of the funnel are drawn into the inlet manifold under suction. The fourth side 132 of the funnel lacks an air duct and a manifold to ease access to the funnel for emptying cages.

The air inlet manifold 130 is designed to accommodate a rapid throughput of air (typically 1000 cubic meters per hour, compared to around 600 cubic meters per hour, or less, for conventional systems) while meeting stringent standards for equipment noise. With particular reference to FIGS. 5, 6, 8, and 9, the manifold includes a two-part housing 134 which runs adjacent the three sides 120, 122, and 124 of the funnel opening. A lower member 136 of the housing 134 defines a base wall 138 which closes the air duct 128 between the cabinet sides 102 and the funnel side wall 112. Spaced apertures 140 in the base wall 138 provide access from the housing 134 to the air duct 128. Each aperture 140 is provided with a cylindrical tube 142 which extends downwards from the aperture into the air duct 128. As shown in FIG. 6, there are twelve apertures 140 and corresponding tubes 142 for the housing, although fewer or greater apertures and tubes are also contemplated.

The lower member 136 also defines a first, or inner side wall 146 which extends vertically upwardly from the base wall 138 adjacent to the sides of the funnel upper opening, and an outer, or second wall 148, spaced from the first wall, which extends vertically upwardly from the base wall and runs around an outer edge of the housing. The base wall 138 and side walls 146, 148 thus define a channel.

An upper member, or roof member 150 of the housing is arch-shaped to provide a roof for the lower member. The roof member includes a hemi-cylindrical wall 154 and a vertical inner side wall 156, which extends downwardly from an inner end 158 of the hemi-cylindrical section. The roof is connected adjacent an outer end 160 of the hemi-cylindrical wall to the outer side wall of the lower member by a vertically extending outer side wall 164. The upper member 150 is slightly wider than the lower member 136, such that the inner side wall 156 extends beyond the inner side wall 146 of the lower member to define a narrow, vertically extending air passageway 166 therebetween with an opening 167 adjacent the receiving funnel upper opening 114. Air and airborne particles entering the housing from adjacent the upper opening 114 of the funnel thus pass through opening 167 and into the air passageway 166 and are thereafter directed in a U-shaped curve around an inner surface 168 of the hemi-cylindrical wall 154 of the roof member 150 before being drawn downward through the apertures in the lower member, as shown by path C in FIG. 9. This arrangement of the lower and upper members provides for a high throughput of air while reducing noise output to well below industry noise standards.

Figure 5:
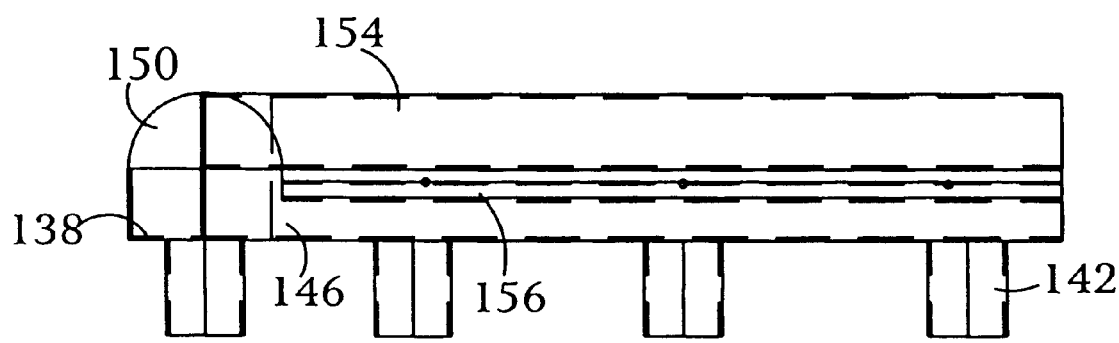
FIG. 5 is an enlarged perspective view of a left section of an air inlet manifold for the tipping funnel of FIGS. 3 and 4.
Figure 6:
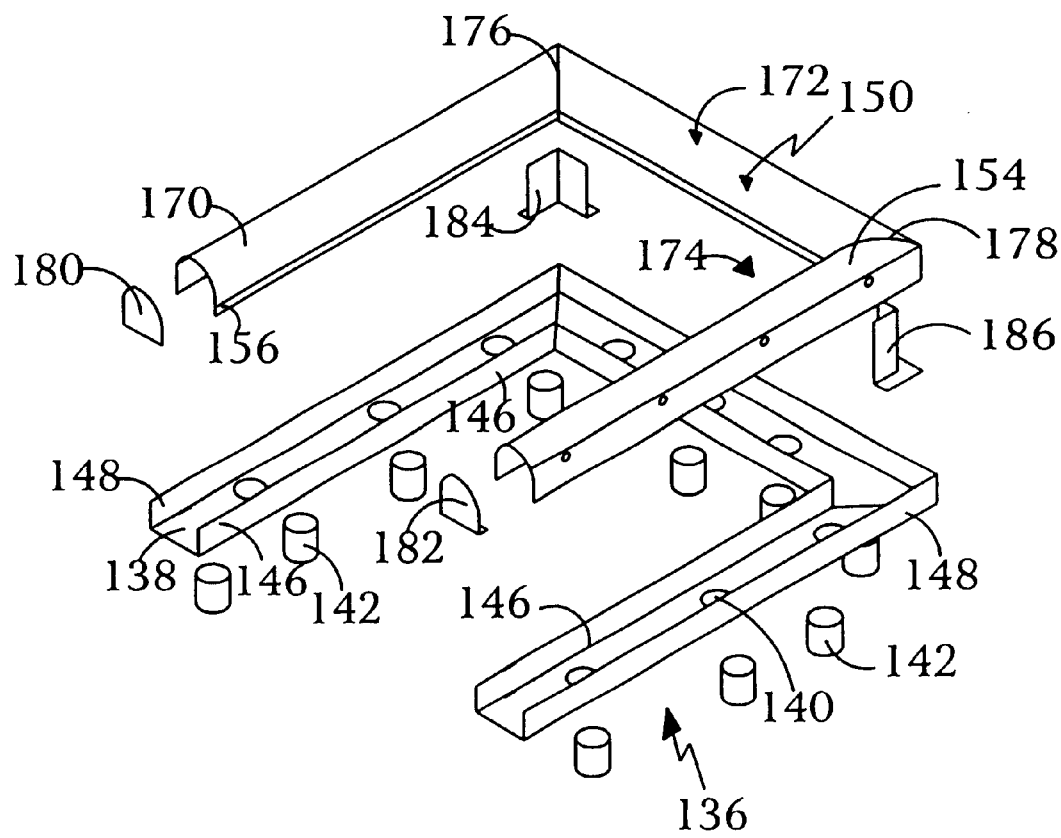
FIG. 6 is an exploded perspective view of the air inlet manifold of FIGS. 3 and 4.
Figure 7:
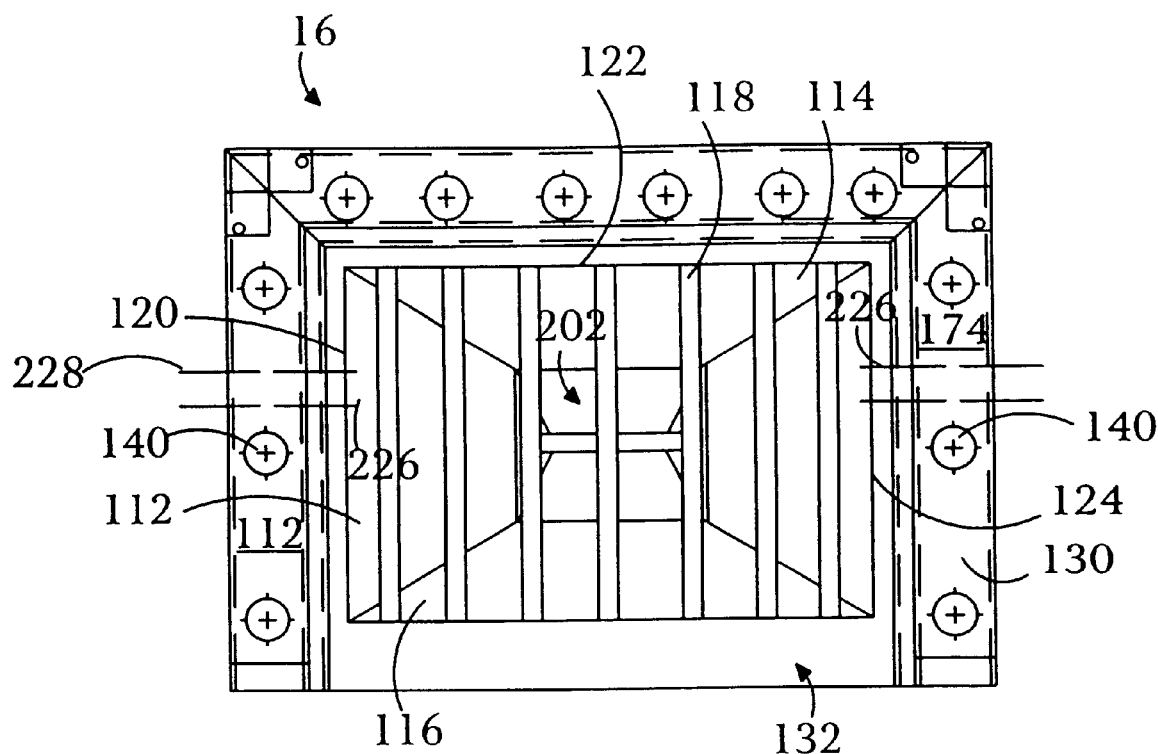
FIG. 7 is an enlarged top view of the tipping funnel of FIGS. 3 and 4.
Figure 8:
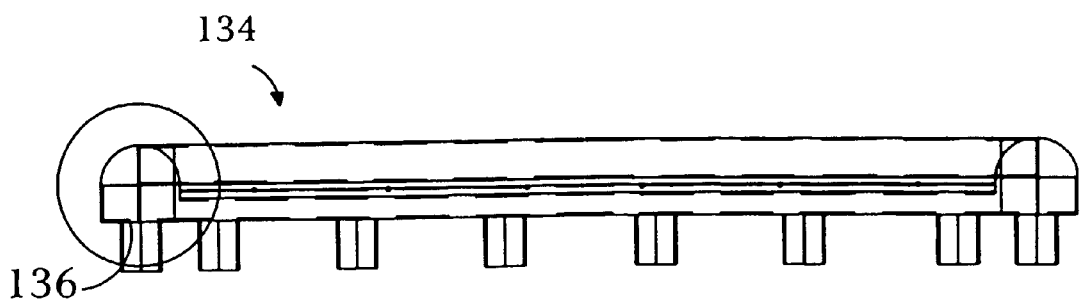
FIG. 8 is an enlarged perspective view of a middle section of the air inlet manifold for the tipping funnel of FIGS. 3 and 4.
Figure 9:
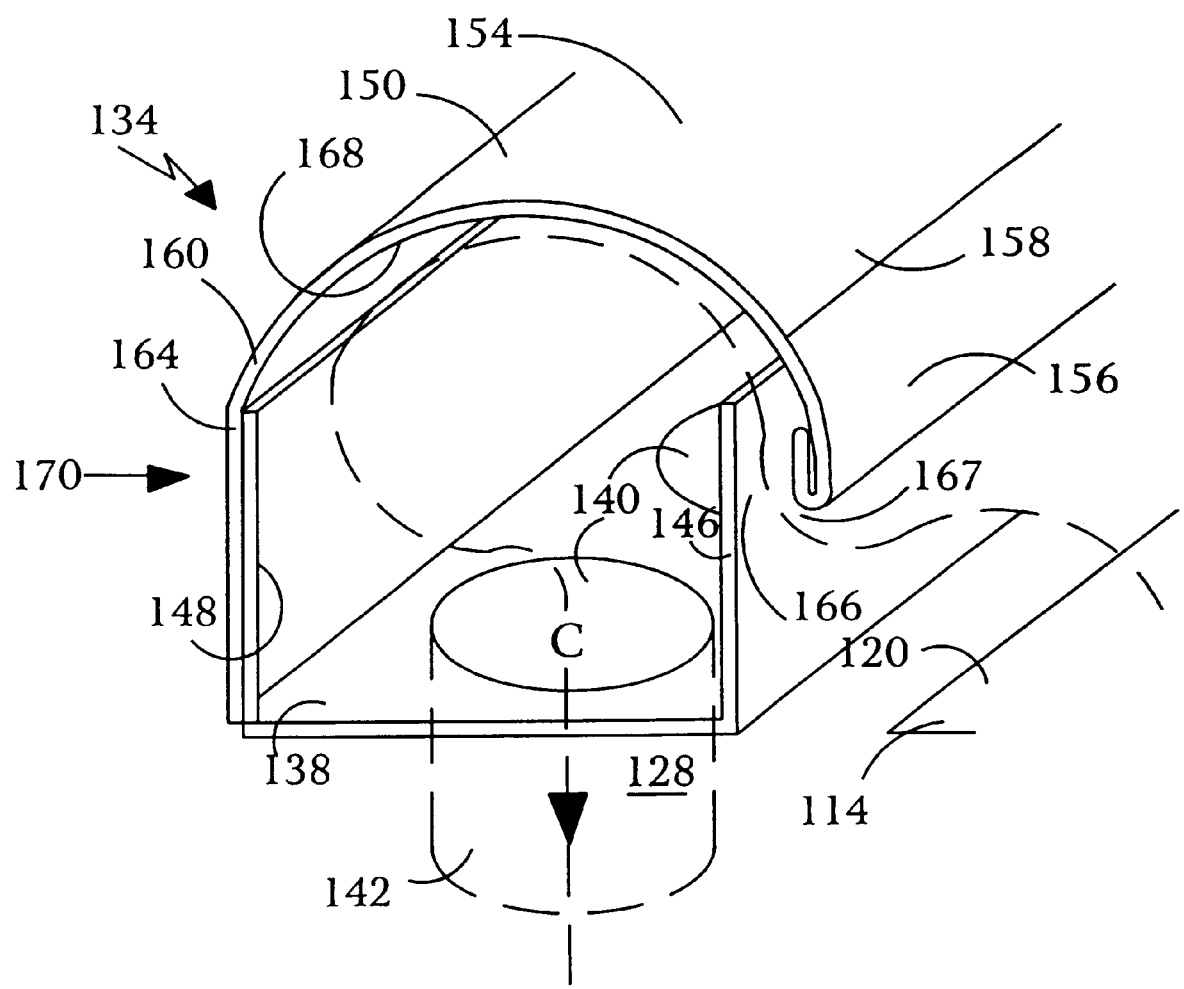
FIG. 9 is an enlarged perspective view of the left section of the air inlet manifold of FIG. 5.

As shown in FIGS. 5, 6, and 7, the upper and lower housing members 150 and 136 are each formed in three sections, a left section 170, a middle section 172, and a right section 174, corresponding to the three sides 120, 122, and 124 of the funnel opening, which are welded or otherwise sealed at their meeting corners 176 and 178. The left and right sections are substantially closed at their open ends by end caps 180 and 182 (omitted in FIG. 9 for clarity). Corner supports 184 and 186 extend between the upper and lower housing members 136, 150 to help to provide rigidity to the housing.

The shape of the housing 134 encourages the suction of air primarily from the vicinity of the funnel opening 114, where airborne particulates are most likely to be present.

Figure 3:
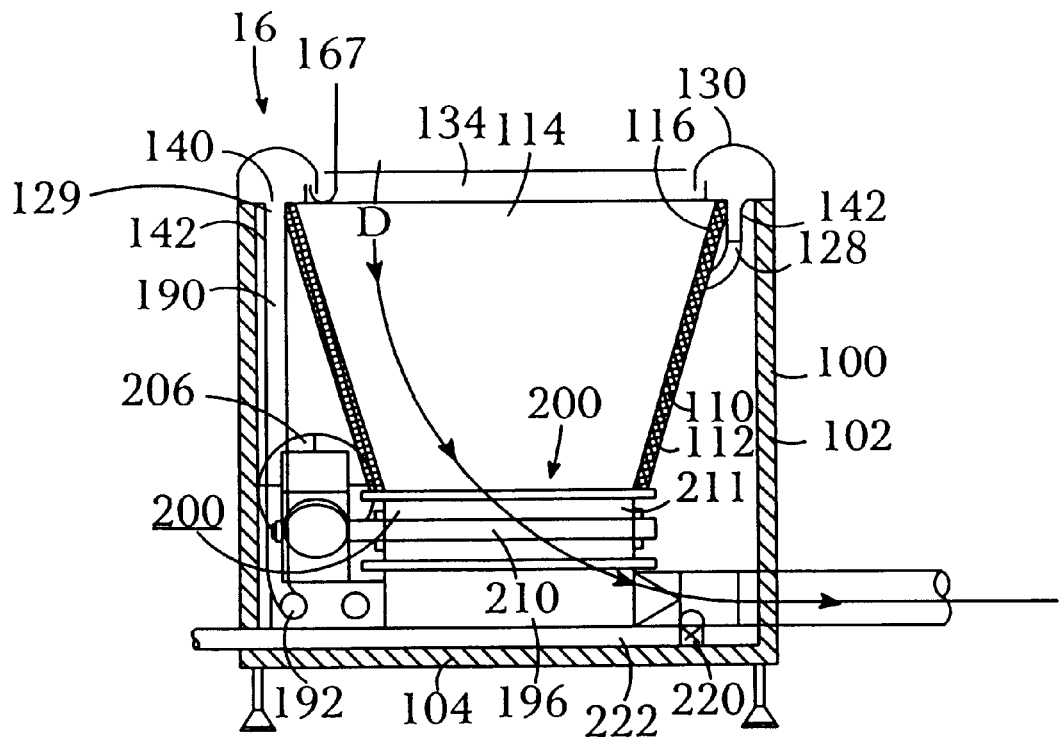
FIG. 3 is a side sectional view of a tipping funnel according to the present invention.
Figure 4:
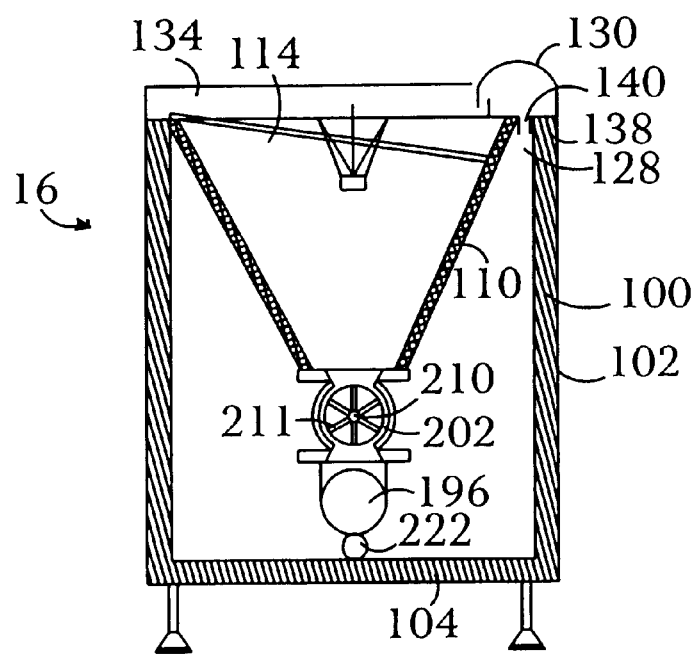
FIG. 4 is another side sectional view of the tipping funnel of FIG. 3.

Conduits, such as hoses 190, best shown in FIG. 3, carry the extracted air from the tubes to an inlet 192 of a vacuum line 196. Alternatively, the space between the cabinet walls 102,104 and the funnel wall 112 is sealed from the exterior to provide a sealed duct for transporting the air to the inlet 192. The vacuum line carries the air and associated airborne materials to the main vacuum line 80. Thus, the same transportation fan provides suction for the air ducts and for transporting the waste bedding from the receiving funnel.

With particular reference to FIGS. 3, 4, 7, and 10, the receiving funnel 110 includes a lower outlet 200. A rotary valve 202 situated beneath the outlet 200 transports the waste bedding from the receiving funnel 110 into the vacuum line 196, through an opening 204 in the vacuum line, directly beneath the rotary valve. Waste bedding follows path D from the funnel into the vacuum line 196, where the waste bedding joins the air sucked into the vacuum line from the air manifold 130. Together, the air and waste bedding are carried along vacuum line 80 to the preseparator 72. The rotary valve 202 is operated by a motor 206, which is contained within the tipping funnel cabinet 100. A cut-out switch (not shown) switches off the rotary valve motor 206 if the grille 118 or air inlet manifold 130 is removed, to prevent injury to an operator.

The use of the rotary valve assists in minimizing the noise produced by the tipping funnel 16. The rotary valve comprises a central rod or hub 210, from which a number of arcuately spaced vanes 211 extend. At any one time, at least two of the vanes separate the receiving funnel 110 from the vacuum source 76 and the vacuum line 196. This minimizes noise which would otherwise travel through the funnel 110 and out of the upper opening 114.

Figure 10:
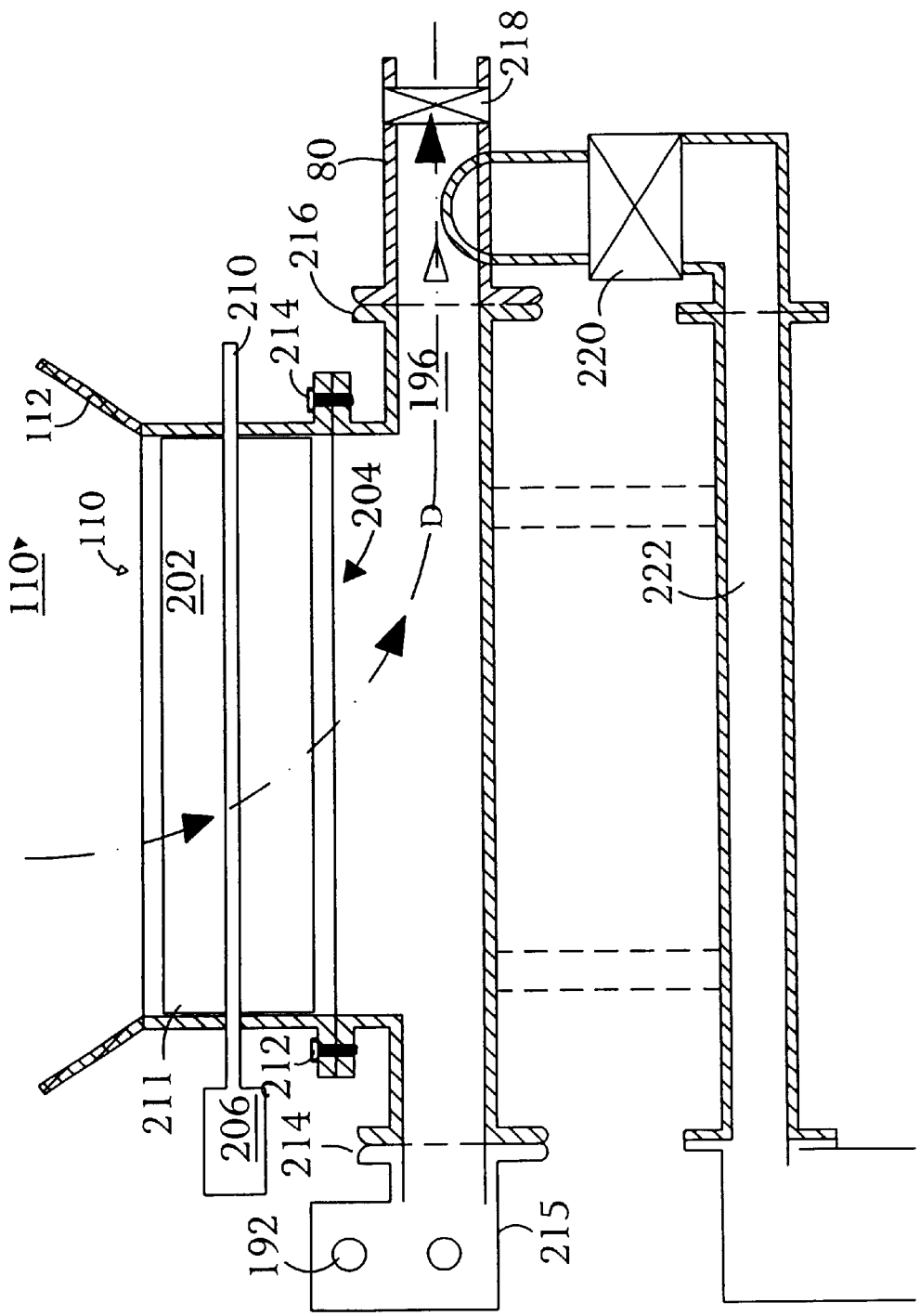
FIG. 10 is an enlarged side sectional view of the base of the tipping funnel and rotary valve of FIGS. 3 and 4.

The vacuum line 196 is removable from the tipping funnel 16 for cleaning. Specifically, as shown in FIG. 10, the vacuum line 196 is releasably and sealingly connected to the rotary valve adjacent the opening 204 by removable fixing members, such as bolts 212. A first sealing clamp 214 adjacent one end of the funnel outlet 200, releasably connects the vacuum line 196 with the hoses 190, via a manifold 215. A second sealing clamp 216, adjacent another end of the funnel outlet 200, releasably connects the vacuum line 196 with the to the main vacuum line 80, although other connecting members are also contemplated.

At intervals, the tipping funnel 16 is cleaned to remove accumulated dirt and feces from the interior of the sides 112 of the funnel, the rotary valve 202, and the vacuum line 196. Although most of the bedding and associated waste material is withdrawn through the vacuum line, a portion adheres to the tipping funnel, and can pose hazards to operators if not periodically removed. Before cleaning the tipping funnel, a valve 218 in the main vacuum line 80 is closed to prevent water or other cleaning solutions from being sucked from the vacuum line 196 into the vacuum system and causing damage to the transportation fan 76. A drain valve 220, which connects the vacuum line 196 to a drain line 222, is opened. The tipping funnel is hosed with water or other suitable cleaning solution while the rotary valve 202 is operated. The water carries the dirt through the rotary valve, vacuum line 196, and drain valve 220 and into the drain line 222 for disposal. Once cleaning is complete, the drain valve 220 is closed and the valve 218 is opened once more. To facilitate cleaning, spray jets 226 optionally spray the cleaning solution over the interior of the sides 112 of the funnel. As shown in FIG. 7, the jets 226 receive water from a water inlet 228. Preferably, a plurality of jets are positioned adjacent the sides 112 of the funnel, near the upper opening 114 to the funnel, from where they spray cleaning solution over the funnel interior under pressure. The spray jets may be positioned above the tipping funnel opening 114, or extend from the walls 112 into the receiving funnel 110.

Figure 11:
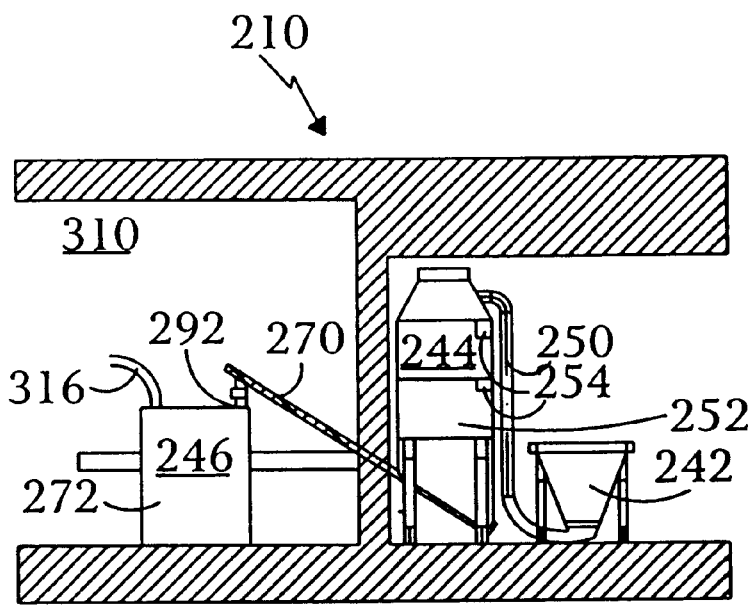
FIG. 11 is a side view of the supply funnel, bedding storage tank, screw feed, and bedding dispensing unit of FIG. 1.
Figure 12:
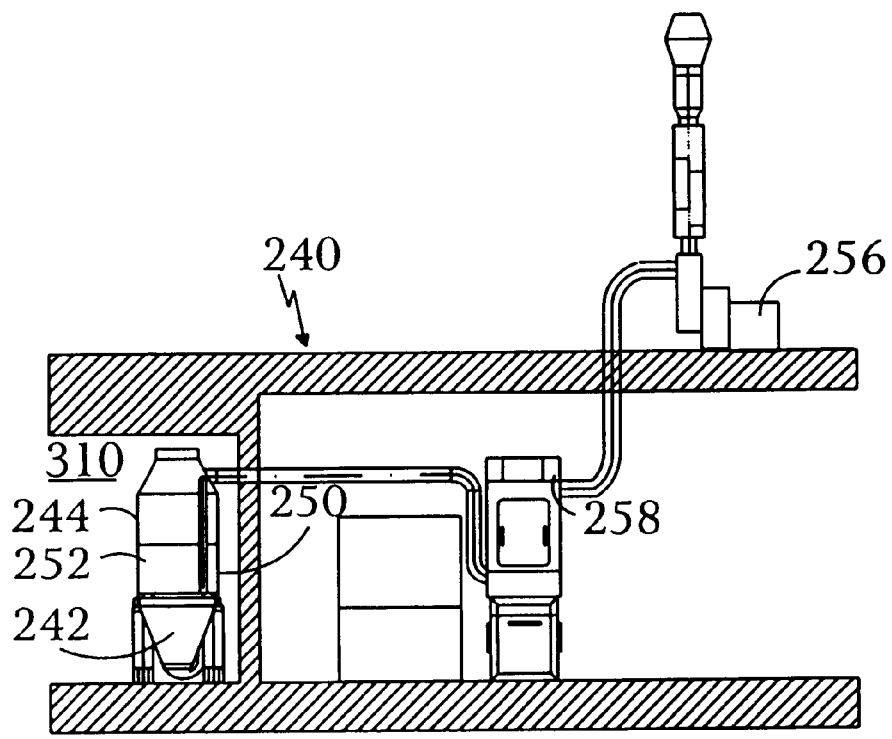
FIG. 12 is a side view of the supply funnel and bedding storage tank of FIG. 1.
Figure 13:
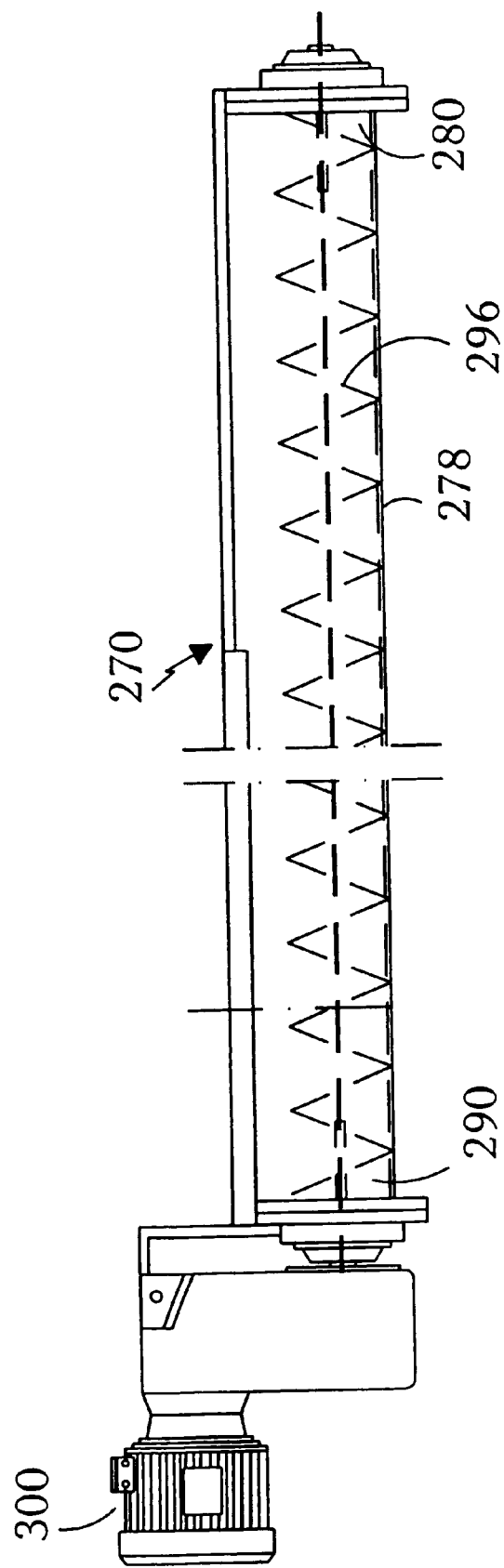
FIG. 13 is an enlarged side view, in partial section, of the screw feed of FIG. 11.
Figure 14:
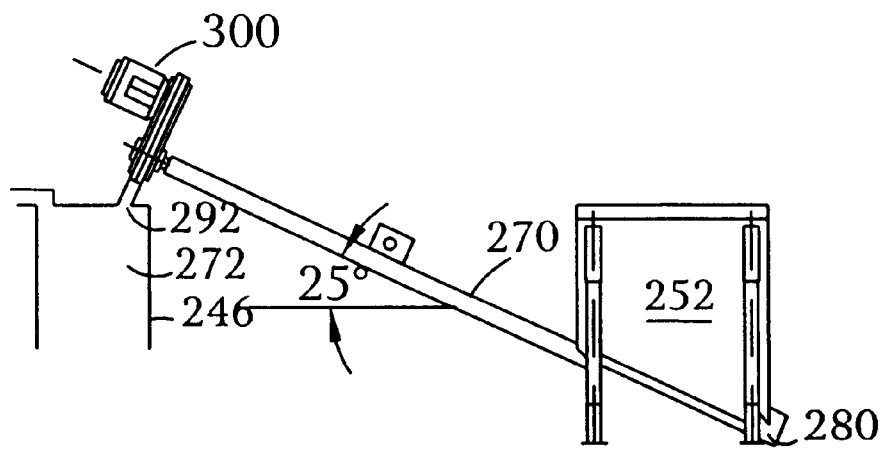
FIG. 14 is an enlarged side view of the base of the storage tank and screw feed of FIG. 11.
Figure 15:
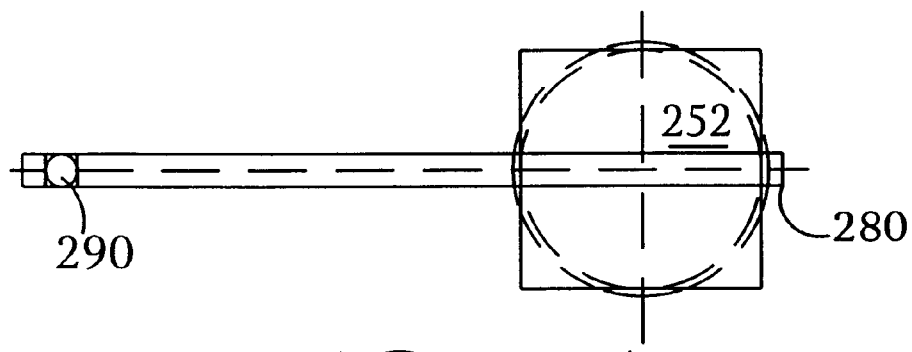
FIG. 15 is a schematic top view of the screw feed and storage tank of FIG. 14; and, FIG. 16 is a side sectional view of the base of the storage tank of FIG. 14.
Figure 16:
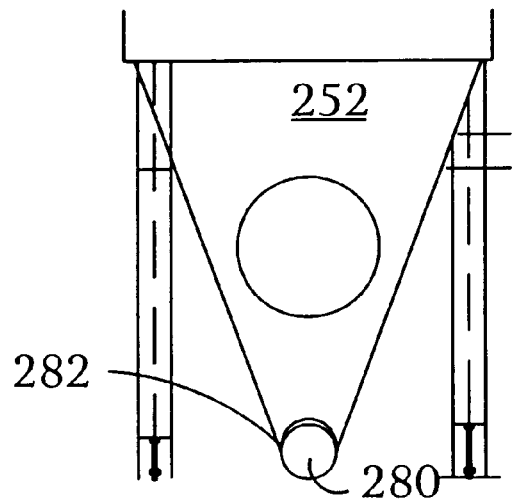

With reference to FIGS. 1, 11, and 12, a clean bedding supply system 240 comprises the bedding dispensing station 44, a loading funnel 242, a storage tank 244, and a bedding dispensing unit 246. Fresh bedding, such as pine chips, is unloaded from sacks into the loading funnel 242 and carried along a conduit 250 under vacuum to the storage tank. The storage tank includes an internal chamber 252 which preferably holds about a day's supply of fresh bedding. Sensors 254, within the chamber, detect whether the tank has sufficient capacity to receive additional bedding. The computer 60 receives signals from the sensors 254 and controls a source of vacuum, such as a transportation fan 256, which is connected with the storage tank 244 for drawing the fresh bedding from the loading funnel 242 into the chamber 252. Transportation air is carried by the fan through a filter 258 to remove airborne particles before being exhausted to the atmosphere.

With reference also to FIGS. 13–20, a screw feed 270 transfers the fresh bedding, as needed, to an interior chamber 272 of the bedding dispensing unit 246. The screw feed is inclined at around 25 degrees to the horizontal. The screw feed includes a cylindrical pipe 278, which is connected adjacent a lower end 280 to an opening 282 in the base of the storage tank chamber 252. An upper end 290 of the pipe dispenses the clean bedding into an upper opening 292 in the dispensing unit chamber. An auger 296, running axially within the pipe 278 is rotated by a motor 300, located adjacent the upper end 290 of the pipe. The screw feed 270 allows the transfer of bedding from the storage tank chamber 252 to the bedding dispensing unit chamber 272 despite the vacuum acting on the storage tank chamber.

The fresh bedding is carried under vacuum from the bedding dispensing unit 246 to the bedding dispensing station 44 in the clean room. Preferably the bedding dispensing unit, storage tank 244, and loading funnel 242 are housed in a separate bedding storage room 310, or rooms. A vacuum source, such as a vacuum pump 314, associated with the bedding dispensing unit transports the fresh bedding from the bedding dispensing unit chamber along a conduit 316 to the bedding dispensing station.

Preferably, the bedding dispensing station 44 is automated for delivery of the fresh bedding through a dispensing outlet 320 into the washed cages 10. The station 44 includes a sensor 322 which recognizes the presence of a clean cage beneath the outlet 320 and opens a valve 326 to deliver a selected weight or volume of bedding to the cage. Alternatively, the station is manually operated by an operator.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A system for disposal of waste materials from animal cages, the waste materials tending to release airborne particles, the system comprising:
   a tipping funnel which receives waste materials, the tipping funnel including:
      a receiving funnel with an upper receiving opening and a lower discharge opening,
      a vacuum line connected with the lower discharge opening to receive the waste material from the receiving funnel, and
      an air duct with an opening adjacent the upper opening of the receiving funnel; and
   a source of suction connected with the air duct, such that air and the airborne particles are drawn into the air duct opening by the source of suction as the waste materials are tipped into the upper opening of the receiving funnel.

2. The system of claim 1, further including:
   a housing, which defines the air duct opening, positioned over the air duct, the housing defining an air inlet pathway adjacent the receiving funnel upper opening, the air and airborne particles being drawn through the air inlet pathway in the housing and into the air duct.

3. A system for disposal of waste materials from animal cages, the waste materials tending to release airborne particles, the system comprising:
   a tipping funnel which receives waste materials, the tipping funnel including:
      a receiving funnel with an upper opening;
      an air duct;
   a housing which defines an opening for the air duct, the housing including:
      a roof member which defines a side wall, and
      a lower member which defines a side wall, the side wall of the roof member overlapping the side wall of the lower member to define an air inlet pathway therebetween adjacent the receiving funnel upper opening, the air and airborne particles being drawn through the air inlet pathway and into the air duct; and
   a source of suction connected with the air duct, such that air and the airborne particles are drawn into the air duct opening by the source of suction as the waste materials are tipped into the upper opening of the receiving funnel.

4. The system of claim 3, wherein the lower member further includes:
   a base which covers the air duct opening, the base defining a plurality of apertures which fluidly connect the housing with the air duct.

5. The system of claim 3, wherein the roof member defines a curved roof portion, such that air entering the housing through the air inlet pathway is directed up and around the roof portion before entering the air duct.

6. A system for disposal of waste materials, the waste materials tending to release airborne particles, the system comprising:
   a tipping funnel which receives waste materials, the tipping funnel including:
      a receiving funnel with an upper opening,
      an air duct with an opening adjacent the upper opening of the receiving funnel,
      a source of suction connected with the air duct, such that air and the airborne particles are drawn into the air duct opening by the source of suction as the waste materials are tipped into the upper opening of the receiving funnel,
      a vacuum line which receives the waste material from the receiving funnel, and
      a valve connected between a lower outlet of the receiving funnel and the vacuum line for selectively transferring the waste material to the vacuum line; and
   a vacuum source connected with the vacuum line.

7. The system of claim 6, wherein the valve is a rotary valve including:
   a hub; and
   a plurality of vanes connected with the hub, at least two of the vanes separating the receiving funnel from the vacuum line as the valve rotates, thereby reducing transfer of noise from the vacuum source into the receiving funnel and out through the upper opening.

8. The system of claim 6, wherein the vacuum line is selectively isolatable from the valve to prevent damage to the vacuum source during washing of the tipping funnel.

9. The system of claim 6, wherein the vacuum source provides the source of suction.

10. A system for handling animal cages comprising:
    a tipping funnel which receives waste bedding materials from the cages for disposal, the waste bedding materials tending to release airborne particles, the tipping funnel including:
       a receiving funnel with an upper opening and a lower outlet,
       an air duct with an opening adjacent the upper opening of the receiving funnel, and
       a source of suction connected with the air duct and with the lower outlet of the receiving funnel, such that the source of suction draws air and airborne particles into the air duct opening as the waste materials are tipped into the upper opening and draws received bedding materials from the receiving funnel through the lower outlet;
    a washer which cleans the cages emptied of waste bedding; and a bedding dispenser for dispensing fresh bedding into the cleaned cages.

11. A system for handling animal cages comprising:

a tipping funnel which receives waste bedding materials from the cages for disposal, the waste bedding materials tending to release airborne particles, the tipping funnel including:
- a receiving funnel with an upper opening and a lower outlet,
- an air duct with an opening adjacent the upper opening of the receiving funnel, and
- a source of suction connected with the air duct, such that air and airborne particles are drawn into the air duct opening by the source of suction as the waste materials are tipped into the upper opening;

a pneumatic conveyor network connected with the funnel lower outlet, the air duct, the suction source, and a disposal container such that waste bedding and associated dust are entrained in air and deposited in the disposal container; and a washer which cleans the cages emptied of waste bedding.

12. The system of claim 11, further including:
an industrial robot which empties the waste bedding from the cages into the tipping funnel and carries the cages from the tipping funnel to the washer.

13. A system for handling animal cages comprising:

a tipping funnel which receives waste bedding materials from the cages for disposal, the waste bedding materials tending to release airborne particles;

a source of suction connected with the tipping funnel, such that airborne particles and received waste bedding materials from the tipping funnel are withdrawn by the source of suction as the waste bedding materials are tipped into the tipping funnel;

a washer which cleans the cages emptied of waste bedding;

a bedding dispenser for dispensing fresh bedding into the cleaned cages; and a conveyor system for delivering fresh bedding from a storage hopper to the bedding dispenser.

14. The system of claim 13, wherein the conveyor system includes a screw feed conveyor.

15. A method of handling waste materials which tend to become airborne comprising:

tipping the waste materials into a receiving funnel through an opening in the receiving funnel;

drawing air into an air duct having an opening adjacent the receiving funnel opening to entrain particles of the waste materials which are airborne and carry the airborne particles into the air duct; and transporting the particles of the waste materials from the air duct and the waste materials from the receiving funnel along a vacuum line.

16. A method of handling waste materials which tend to release airborne particulates comprising:

tipping the waste materials into a receiving funnel through an opening in the receiving funnel; and drawing air into an air duct through a housing which reduces noise produced during drawing air into the air duct, the air duct having an opening adjacent the receiving funnel opening to entrain particles of the waste materials which are airborne, cause the air to follow a U-shaped pathway around a curved roof of the housing, and carry the airborne particles into the air duct.

17. A method of handling waste materials which tend to become airborne comprising:

tipping the waste materials into a receiving funnel through an opening in the receiving funnel;

drawing air into an opening adjacent the receiving funnel opening to entrain particles of the waste materials which become airborne; and transferring the waste material from the receiving funnel to a vacuum line.

18. The method of claim 17, wherein the step of transferring the waste material using a rotating valve having a plurality of vanes, at least two of the vanes separating the receiving funnel from the vacuum line to minimize transfer of noise from the vacuum line into the receiving funnel.

19. The method of claim 17, further including:
intermittently isolating the vacuum line from the receiving funnel; and
washing the receiving funnel to remove adhered waste material.

* * * * *